(12) United States Patent
Wulff

(10) Patent No.: US 7,093,567 B1
(45) Date of Patent: Aug. 22, 2006

(54) INTERNAL COMBUSTION SYSTEM AND METHOD OF OPERATION

(76) Inventor: Joseph W. Wulff, Route 1, Box 8801, Highway HH, Hallsville, MO (US) 65255

(*) Notice: Subject to any disclaimer, the term of this patent is extended or adjusted under 35 U.S.C. 154(b) by 0 days.

(21) Appl. No.: 11/215,397

(22) Filed: Aug. 30, 2005

Related U.S. Application Data

(60) Provisional application No. 60/686,194, filed on Jun. 1, 2005, provisional application No. 60/687,192, filed on Jun. 2, 2005, provisional application No. 60/694,826, filed on Jun. 29, 2005.

(51) Int. Cl.
*F02B 43/02* (2006.01)

(52) U.S. Cl. ........................ 123/1 A; 123/525
(58) Field of Classification Search ............... 123/3, 123/1 A
See application file for complete search history.

(56) References Cited

U.S. PATENT DOCUMENTS

| | | | | | |
|---|---|---|---|---|---|
| 3,664,134 | A | * | 5/1972 | Seitz | 60/274 |
| 3,799,124 | A | * | 3/1974 | Swain | 123/1 A |
| 3,982,391 | A | * | 9/1976 | Reynolds | 60/780 |
| 4,140,090 | A | * | 2/1979 | Lindberg | 123/265 |
| 4,333,739 | A | * | 6/1982 | Neves | 44/308 |
| 4,384,551 | A | * | 5/1983 | Scott | 123/1 A |
| 4,444,159 | A | * | 4/1984 | Earl | 123/3 |
| 4,757,787 | A | | 7/1988 | Risitano et al. | |
| 4,884,533 | A | | 12/1989 | Risitano et al. | |
| 5,266,083 | A | * | 11/1993 | Peter-Hoblyn et al. | 44/358 |
| 6,076,487 | A | * | 6/2000 | Wulff et al. | 123/1 A |
| 6,287,351 | B1 | | 9/2001 | Wulff et al. | |
| 6,575,147 | B1 | * | 6/2003 | Wulff et al. | 123/525 |

OTHER PUBLICATIONS

Katsumi Kataoka, Computational Estimaiton of the Performance of a SI Engine w/ Various Fuels, Nippor Kikkal Gakkal Ronbunshu, B Hen., v56, n523, Mar. 1990, pp. 830-835, Japan.
J.E. Sinor Consultants, Acetylene Could Be Synthetic Fuel For Transportation, Sinor Synthetic Fuels Report, vol. 8, No. 1, Jan. 2001, USA. http://edj.net/sinor/sfr1-01art2.html.

* cited by examiner

Primary Examiner—Henry C. Yuen
Assistant Examiner—Jason Benton
(74) Attorney, Agent, or Firm—Lathrop & Gage LC

(57) ABSTRACT

Internal combustion (I.C.) systems and methods provided herein substantially eliminate incomplete combustion, unburned hydrocarbon emission, and hydrocarbon, CO, $NO_x$, and $SO_x$ emissions. A method of one embodiment includes the steps of providing a fuel stream containing acetylene, providing an I.C. engine, and introducing the fuel stream to the engine's intake port. A method of another embodiment includes the steps of providing a fuel source selected from the group consisting of acetylene and hydrogen, providing an I.C. engine, and introducing the fuel source to the engine's intake port. Still another embodiment's method includes the steps of providing a fuel stream that doesn't include gasoline, diesel fuel, or an alcohol selected from the group consisting of $C_1$–$C_{20}$ alcohols, providing an I.C. engine, and introducing the fuel stream to the engine's intake port. In an embodiment, an I.C. system is provided, including an I.C. engine and a fuel stream containing acetylene.

33 Claims, 3 Drawing Sheets

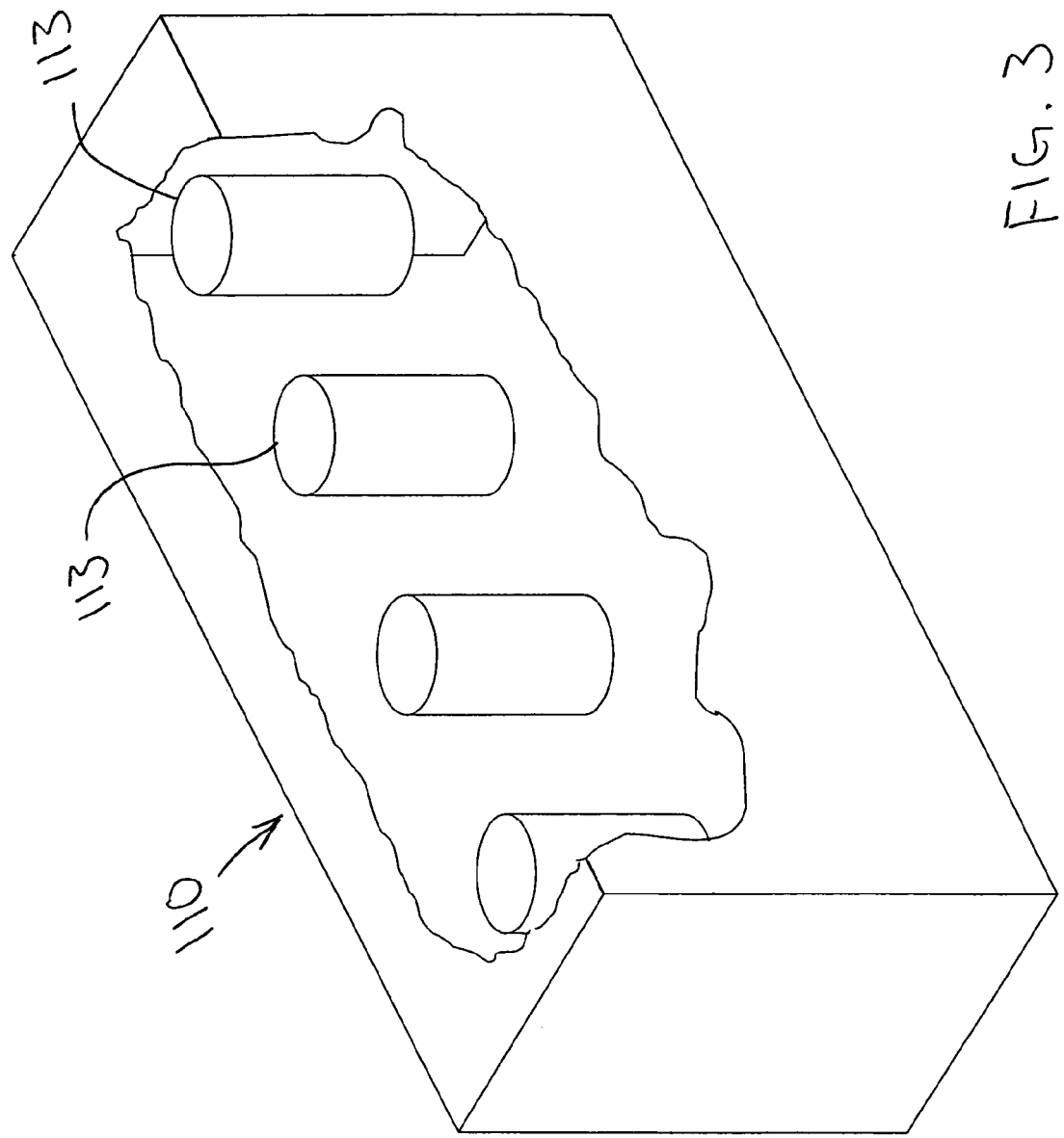

INTERNAL COMBUSTION SYSTEM AND METHOD OF OPERATION

RELATED APPLICATIONS

This application claims benefit of priority to U.S. Patent Applications Ser. No. 60/686,194, filed Jun. 1, 2005; U.S. Patent Application Ser. No. 60/687,192 filed Jun. 2, 2005; and U.S. Patent Application Ser. No. 60/694,826 filed Jun. 29, 2005, all of which are hereby incorporated herein by reference.

BACKGROUND

The present invention relates to an internal combustion system using alternative fuels, and more particularly to an internal combustion system utilizing acetylene or hydrogen.

Acetylene is conventionally produced by reacting calcium carbide with water. The reaction is spontaneously occurring and can be conducted without any sophisticated equipment or apparatus. Such produced acetylene has been utilized for lighting in mine areas, by street vendors, etc. People often call such lighting sources "carbide lights" or "carbide lamps". Industrial uses of acetylene as a fuel for motors or lighting sources, however, has been nearly nonexistent. In modern times, the use of acetylene as a fuel has been largely limited to acetylene torches for welding or welding-related applications. In most such applications, acetylene is generally handled in solution form, such as acetylene dissolved in acetone, for example.

The clean burning nature of acetylene is self-evident from the stoichiometric equation:

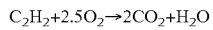

$$C_2H_2 + 2.5O_2 \rightarrow 2CO_2 + H_2O$$

The reaction proceeds spontaneously at any temperature and pressure conditions and easily goes to completion without leaving any residues other than the desired combustion products, namely carbon dioxide and water. Further, the reaction ideally takes place in a gaseous phase without any need for catalytic assistance. The gas-phase reaction has several advantages over heterogeneous reactions such as gas-liquid, gas-solid, and solid-liquid reactions. For example, the gas-phase reaction does not require much effort for mixing necessary ingredients, assuring proper ratios, or handling by-products of combustion. Such advantages become very significant in fuel applications for combustion engines where liquid fuels such as gasoline have been conventionally used, and gasoline (liquid-phase) and air (gas-phase) interact in an engine for combustion reaction purposes.

Gas-phase reaction, however, involves different measures, controls, and safety precautions. If acetylene is used either in pure form or in concentrated form, there is a strong tendency for detonation, which directly contributes to the difficulty in preventing undesirable spontaneous chemical reaction.

Combustion reactions occurring at relatively low temperature conditions could provide several advantages, including the following:

1) Atmospheric nitrogen requires a relatively high temperature (T>1200° C.) to react with atmospheric oxygen in order to form nitrogen oxides ($NO_x$) to any significant amount, the family of nitrogen oxides generally include $N_2O$, $NO$, $N_2O_3$, $NO_2$, and $N_2O_5$. Even at lower temperatures (T=900° C.), small amounts of nitrogen oxides can be formed but only over extended periods of time. However, at such low temperatures, formation of $NO_x$ from reactions between nitrogen and oxygen are negligible or nonexistent.

2) Low engine temperature alleviates any need for special emission control equipment commonly used in motor vehicles, such as an emission gas recirculation ("EGR") valve, for example. One of the primary functions of an EGR system in modern motor vehicles is to reduce the combustion temperature by recirculating a portion of exhaust gas into the intake manifold, thus achieving a reduction in $NO_x$ formation in the combustion chamber. Such a requirement is not needed in an engine operating under relatively low temperature conditions.

3) Low engine temperatures significantly reduce any substantial requirement for motor cooling. Cooling for an engine operating under relatively low temperature conditions can be readily accomplished either by air-cooling or by water cooling (including with ethylene glycol-water mixtures, propylene glycol-water mixtures, and the like,) but with less stringent capacities than with engines operating at relatively high temperatures.

4) Low motor temperature and clean burning help and boost the fuel efficiency, since the combustion energy generated goes far less toward the maintenance of the engine temperature. In other words, the power produced per BTU generated by the fuel is greater in the case of acetylene than for other conventional fuels under the circumstances.

5) Low temperature combustion permits simpler and cheaper exhaust system design, such as shorter length, for example, particularly when the combustion products consist only of carbon dioxide and water. In addition, the hardware for such an exhaust system could be physically smaller in size.

It has been suggested that acetylene as a single fuel cannot be burned in an IC engine without severe knock and early ignition in the intake port and the cylinder, causing engine stopping and damage. For example, the results obtained from a computer model used to estimate the performance of a spark ignition engine when acetylene was used as a fuel was reported in "Computational Estimation of the Performance of a S. I. Engine with Various Fuels," *Nippon Kikai Gakkai Ronbunshu, B Hen.*, v. 56, n. 523, March 1990, pp. 830–835, by Katsumi Kataoka. Those calculations disclosed that when acetylene is used as a fuel, the flame temperatures rise high enough to cause the deterioration of the efficiency because of thermal dissociation, resulting in fairly high emissions of NO, especially with lean mixtures. In other words, these results appear to teach away from the use of acetylene as a fuel for IC engines.

As discussed in my U.S. Pat. Nos. 6,287,351 and 6,076,487, acetylene may be used with a secondary fuel such as $C_1$–$C_{12}$ alcohols for IC engines. However, the use of a secondary fuel requires a somewhat complicated engine design to ensure the correct fuel is introduced at the correct time.

It would be advantageous to have a system and method that utilizes acetylene as a fuel source for IC engines without requiring a secondary fuel. Further, it would be desirable to be able to substitute hydrogen for acetylene as a fuel source for an IC engine, as hydrogen is an abundant and clean-burning fuel.

SUMMARY

Internal combustion systems and methods utilizing alternative fuels are provided herein that substantially eliminate incomplete combustion by the internal combustion system, substantially eliminate unburned hydrocarbon emissions by the internal combustion system, and substantially eliminate hydrocarbon, CO, $NO_x$, and $SO_x$ emissions by the internal combustion system. Secondary fuel sources are not required in the inventive systems and methods. A method of one embodiment includes the steps of providing a fuel stream containing acetylene, providing an internal combustion engine, and introducing the fuel stream to an intake port of the internal combustion engine. A method of another embodiment includes the steps of providing a fuel source selected from the group consisting of acetylene and hydrogen, providing an internal combustion engine, and introducing the fuel source to an intake port of the engine. A method of still another embodiment includes the steps of providing a fuel stream that does not include gasoline, diesel fuel, or an alcohol selected from the group consisting of $C_1$–$C_{20}$ alcohols, providing an internal combustion engine, and introducing the fuel stream to an intake port of the engine.

In an embodiment, an internal combustion system is provided, including an internal combustion engine and a fuel stream containing acetylene.

BRIEF DESCRIPTION OF THE DRAWINGS

FIG. 3 is a sectional view of an engine as in FIG. 1.

DETAILED DESCRIPTION

Figure 1:
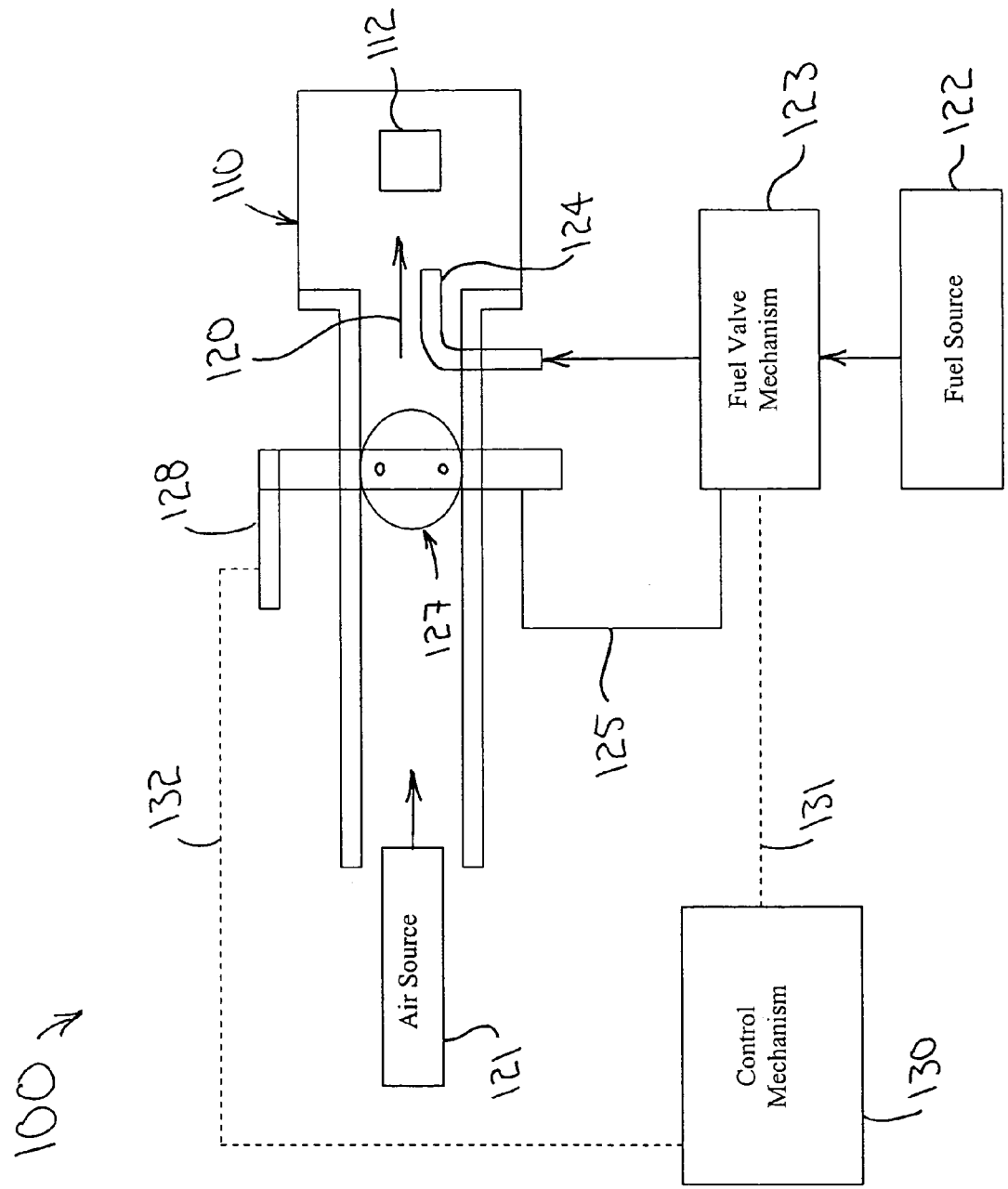
FIG. 1 is a schematic diagram of an internal combustion system, in accordance with the present invention.

FIG. 1 shows a schematic diagram of an internal combustion system 100 that includes an internal combustion engine 110 and a fuel stream 120. The internal combustion system 100 is generally based on a one-stage ignition procedure, and the fuel stream 120 preferably includes air 121 and a fuel source 122. The fuel source 122 may be acetylene or hydrogen, and the fuel source 122 preferably does not include gasoline, diesel fuel, or an alcohol selected from the group consisting of $C_1$–$C_{20}$ alcohols. Gasoline and diesel fuel are avoided because of the hydrocarbon, CO, $NO_x$, and $SO_x$ emissions that correspond with their use. Unlike the two-stage ignition procedure for utilizing acetylene in an internal combustion system disclosed in my U.S. Pat. No. 6,076,487, a $C_1$–$C_{20}$ alcohol is not necessary in the present inventive system due to the one-stage ignition procedure and the improvements contained herein.

Figure 2:
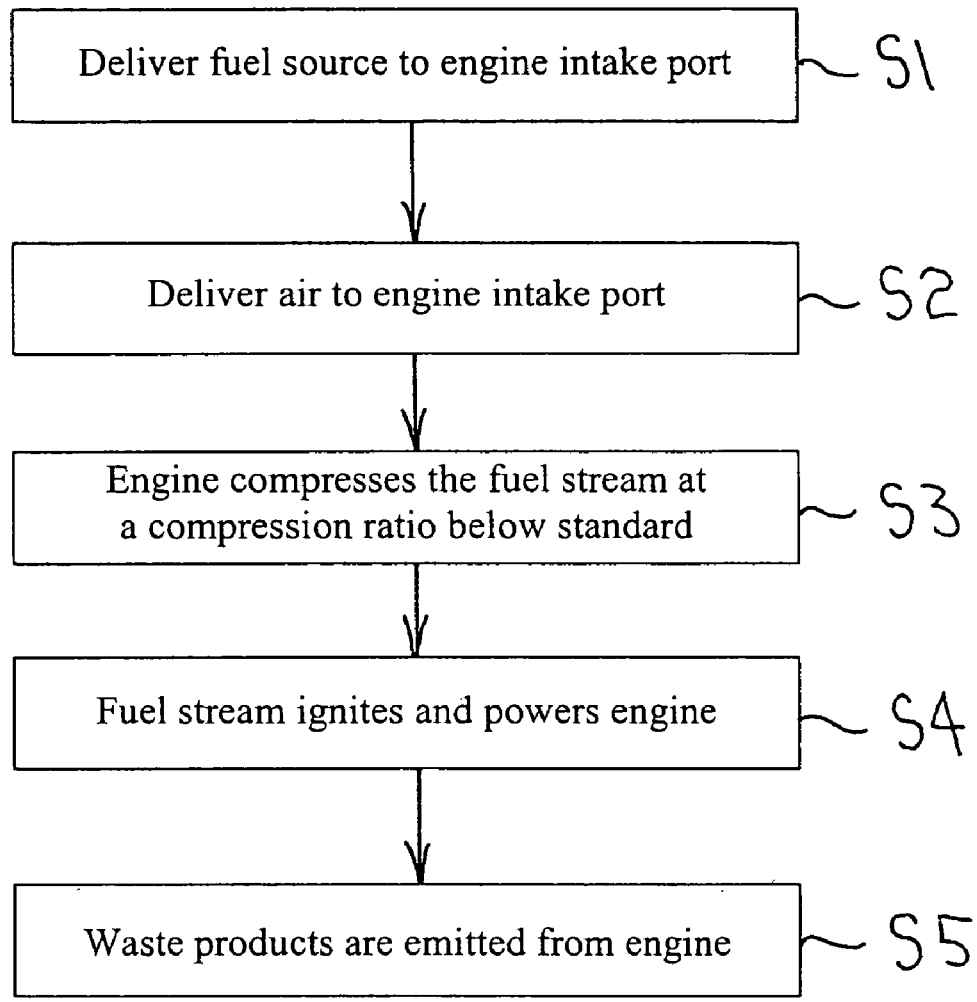
FIG. 2 is a flow chart depicting a method of operating the inventive internal combustion system as in FIG. 1.

As shown in FIG. 2, a first step S1 in a method 102 of operating the internal combustion system 100 involves delivering the fuel source 122 through an injection port 124 to an intake port 112 of the engine 110, and a second step S2 involves delivering the air 121 to the engine intake port 112. The fuel source 122 may be metered and directly injected into a combustion chamber of the engine 110 whereat the fuel source 122 is first exposed to the air 121 as an oxygen-containing combustion-inducing environment, or delivered in any other appropriate manner, known to those skilled in the art. Both the fuel source 122 and the air 121 preferably have separate and adjustable flow rates. Control of the ratio of the air 121 to the fuel source 122 can be realized by a fuel valve mechanism 123, such as a preset valve 123, a throttling valve 123 permitting automatic adjustment, or other suitable arrangement. More specifically, the flow rate of the fuel source 122 may be regulated by connecting the fuel valve mechanism 123 by a linkage arrangement, schematically shown and indicated by the numeral 125 in FIG. 1, to a throttle valve mechanism 127, configured to operatively control the flow of air 121 to the engine intake port 112. The throttle valve mechanism 127, in turn, includes a linkage, schematically shown by the element designated by the numeral 128, to provide speed control for the engine 110. So long as the oxygen content of the input air 121 exceeds stoichiometric requirements to accomplish complete combustion of the fuel source 122, the process will satisfactorily proceed to completion.

Alternatively, a control system 130, such as a microprocessor arrangement for example, may be connected to the fuel valve mechanism 123 and the linkage 125 by connections schematically indicated by dashed lines designated by numerals 131 and 132, to provide desired amounts of the fuel source 122 as needed for selected operating speeds of the engine 110.

After the fuel stream 120 is introduced to the engine intake port 112, the method 102 continues to a third step S3, shown in FIG. 2. At step S3, the engine 110 compresses the fuel stream 120 at a compression ratio below the standard compression ratio of 9:1. Using an acetylene fuel source 122, the standard compression ratio of 9:1, and no secondary fuel source, the engine 110 will experience severe knock and early ignition in the intake port and the cylinder, causing engine stoppage and damage. By reducing the compression ratio to less than 9:1, preferably between 7:1 and 9:1, more preferably approximately 8:1, for a fuel stream 120 that includes acetylene, the knock and early ignition problems may be avoided. To compress the fuel stream 120 to the desired compression ratio, the engine 110 has a compression ratio less than 9:1, preferably between 7:1 and 9:1, and more preferably approximately 8:1. If a fuel stream 120 that includes hydrogen is used, the fuel stream 120 is preferably compressed to a compression ratio between 6:1 and 7:1 after the fuel stream 120 is introduced to the engine intake port 112. To compress the hydrogen fuel stream 120 to the desired compression ratio, the engine 110 may have a compression ratio between 6:1 and 7:1.

At step S4, the fuel stream 120 is ignited and combusts, powering the engine 110, and the waste products ($CO_2$ and $H_2O$ if acetylene is the fuel source 122) are emitted from the engine 110 at step S5.

It is notable that the knock and early ignition problems are avoided without including gasoline, a diesel fuel, or an alcohol selected from the group consisting of $C_1$–$C_{20}$ alcohols in the fuel stream 120 and without introducing gasoline, a diesel fuel, or such an alcohol to the engine intake port 112. By providing ample oxygen to accomplish complete combustion of the fuel source 122, by operating at relatively low temperature conditions (preferably no more than 900° C.) and by prohibiting gasoline, diesel fuel, and $C_1$–$C_{20}$ alcohols from being introduced to the engine intake port 112, the process will satisfactorily proceed to completion (incomplete combustion by the internal combustion system 100 is substantially eliminated,) hydrocarbon, CO, $NO_x$, and $SO_x$ emissions by the internal combustion system 100 are substantially eliminated, and unburned hydrocarbon emissions by the internal combustion system 100 are substantially eliminated. This allows the inventive method to be safely conducted in an indoor environment without exhausting the internal combustion system 100 exteriorly from the indoor environment.

The present invention is readily adaptable to both air-cooled engine applications and water-cooled (also referred to as "fluid cooled") engine applications, including, of course, engine applications utilizing various other coolants, such as ethylene glycol or the like. Further, engine 110 preferably includes a plurality of intake and exhaust valves for quick heat dissipation, and the engine 110 is preferably constructed of aluminum or another conductive alloy for quick heat dissipation. If a fluid cooling system is not used, the engine 110 preferably includes a plurality of fins for dissipating heat, though the fins may also be included in conjunction with a fluid cooling system, as well. As shown in FIG. 3, it is also preferred that each cylinder 113 included in the engine 110 is positioned at a sufficient distance from each other cylinder 113 included in the engine 110 so that heat generated in each respective cylinder 113 is not introduced to any other cylinder 113.

An intercooling system is preferably included in the internal combustion system 100 to cool the intake air 121 before the intake air 121 is delivered to the engine intake port 112 at step S2 above. If the engine 110 is a stationary engine, cool underground air (typically between sixty and sixty-two degrees Fahrenheit) is preferably used as the air 121 in the intercooling system. Intercooling or any other method of cooling the intake air 121 may be used in the internal combustion system 100, regardless of whether the engine 110 is a mobile engine or a stationary engine. By cooling the intake air 121, the operating temperature of the engine 110 is decreased and power output, torque output, and reliability of the system 100 are improved.

Those skilled in the art appreciate that variations from the specified embodiments disclosed above are contemplated herein. The description should not be restricted to the above embodiments, but should be measured by the following claims.

What is claimed is:

1. A method of operating an internal combustion system, comprising the steps of:
   providing a fuel stream containing acetylene;
   providing an internal combustion engine;
   introducing the fuel stream to an intake port of the internal combustion engine;
   compressing the fuel stream to a ratio less than 9:1 after the fuel stream is introduced to the engine intake port; and
   constantly maintaining the fuel stream at a temperature below a detonation temperature for the fuel stream before the fuel stream is introduced to the engine intake port, the fuel stream temperature being maintained without the use of a secondary fuel source.

2. The method of claim 1, wherein the fuel stream is compressed to a ratio between 7:1 and 9:1 after the fuel stream is introduced to the engine intake port.

3. The method of claim 1, wherein the fuel stream is compressed to a ratio of approximately 8:1 after the fuel stream is introduced to the engine intake port.

4. The method of claim 3, wherein an alcohol selected from the group consisting of $C_1$–$C_{20}$ alcohols is not present in the fuel stream and is not introduced to the engine intake port.

5. The method of claim 1, wherein an alcohol selected from the group consisting of $C_1$–$C_{20}$ alcohols is not present in the fuel stream and is not introduced to the engine intake port.

6. The method of claim 1, wherein the method is conducted such that incomplete combustion by the internal combustion system is substantially eliminated without the use of an afterburner, catalytic converter, or EGR system.

7. The method of claim 1, wherein the method is conducted such that unburned hydrocarbon emissions by the internal combustion system are substantially eliminated without the use of an afterburner, catalytic converter, or EGR system.

8. The method of claim 1, wherein the method is conducted such that hydrocarbon, CO, $NO_x$, and $SO_x$ emissions by the internal combustion system are substantially eliminated without the use of an afterburner, catalytic converter, or EGR system.

9. The method of claim 1, wherein the method may be safely conducted in an indoor environment without exhausting the internal combustion system exteriorly from the indoor environment and without requiring the use of an afterburner, catalytic converter, or EGR system.

10. An internal combustion system, comprising:
    an internal combustion engine having a compression ratio less than 9:1, the engine being constructed of a conductive alloy for quick heat dissipation;
    a fuel stream containing acetylene.

11. The system of claim 10, wherein the compression ratio is between 7:1 and 9:1.

12. The system of claim 10, wherein the compression ratio is approximately 8:1.

13. The system of claim 12, wherein the fuel stream does not include an alcohol selected from the group consisting of $C_1$–$C_{20}$ alcohols.

14. The system of claim 12, wherein the fuel stream consists of acetylene and air.

15. The system of claim 10, wherein the fuel stream does not include an alcohol selected from the group consisting of $C_1$–$C_{20}$ alcohols.

16. The system of claim 10, wherein the fuel stream consists of acetylene and air.

17. The system of claim 16, wherein the engine includes an intercooling system for cooling the air in the fuel stream to constantly maintain the fuel stream at a temperature below a detonation temperature for the fuel stream before the fuel stream is introduced to an intake port of the engine, the fuel stream temperature being maintained without the use of a secondary fuel.

18. The system of claim 10, wherein the engine includes a fluid cooling system for dissipating heat to help maintain the fuel stream at a temperature below a detonation temperature for the fuel stream before the fuel stream is introduced to an intake port of the engine, the fuel stream temperature being maintained without the use of a secondary fuel.

19. The system of claim 10, wherein the engine includes a plurality of fins for dissipating heat to help maintain the fuel stream at a temperature below a detonation temperature for the fuel stream before the fuel stream is introduced to an intake port of the engine, the fuel stream temperature being maintained without the use of a secondary fuel.

20. The system of claim 19, wherein the engine does not include a fluid cooling system for dissipating heat.

21. The system of claim 10, wherein each cylinder included in the engine is positioned at a sufficient distance from each other cylinder included in the engine so that heat generated in each respective cylinder is not introduced to any other cylinder.

22. The system of claim 10, wherein the engine is constructed of aluminum.

23. A method of operating an internal combustion system, comprising the steps of:
  providing a fuel source selected from the group consisting of acetylene and hydrogen;
  providing an internal combustion engine;
  introducing the fuel source to an intake port of the engine;
  compressing the fuel stream to a ratio less than 9:1 after the fuel stream is introduced to the engine intake port; and
  constantly maintaining the fuel stream at a temperature below a detonation temperature for the fuel stream before the fuel stream is introduced to the engine intake port, the fuel stream temperature being maintained without the use of a secondary fuel source.

24. The method of claim 23, wherein an alcohol selected from the group consisting of $C_1$–$C_{20}$ alcohols is not introduced to the engine intake port.

25. The method of claim 23, wherein the method is conducted such that incomplete combustion by the internal combustion system is substantially eliminated without the use of an afterburner, catalytic converter, or EGR system.

26. The method of claim 23, wherein the method is conducted such that hydrocarbon, CO, $NO_x$, and $SO_x$ emissions by the internal combustion system are substantially eliminated without the use of an afterburner, catalytic converter, or EGR system.

27. A method of operating an internal combustion system, comprising the steps of:
  providing a fuel stream that does not include gasoline, diesel fuel, or an alcohol selected from the group consisting of C1–C20 alcohols;
  providing an internal combustion engine that does not have a precombustion chamber;
  introducing the fuel stream to an intake port of the engine; and
  constantly maintaining the fuel stream at a temperature below a detonation temperature for the fuel stream before the fuel stream is introduced to the engine intake port, the fuel stream temperature being maintained without the use of a secondary fuel source the fuel stream contains acetylene.

28. The method of claim 27, wherein:
  the fuel stream contains air;
  the engine includes an intercooling system for reducing the temperature of the air; and
  further comprising the step of using the intercooling system to reduce the temperature of the air to aid in constantly maintaining the fuel stream at a temperature below the detonation temperature for the fuel stream before the fuel stream is introduced to the engine intake port.

29. The method of claim 27, further comprising the step of compressing the fuel stream to a ratio of approximately 8:1 after the fuel stream is introduced to the engine intake port.

30. The method of claim 1, wherein the fuel stream temperature is maintained by:
  constructing the engine from a conductive alloy for quick heat dissipation;
  the use of a fluid cooling system to dissipate heat from the engine; and
  dissipation of heat through a plurality of fins attached to the engine.

31. The method of claim 1, wherein:
  the engine is a stationary engine; and
  the fuel stream temperature is maintained by:
    constructing the engine from a conductive alloy for quick heat dissipation;
    constructing the engine so that each cylinder included in the engine is positioned at a sufficient distance from each other cylinder included in the engine so that heat generated in each respective cylinder is not introduced to any other cylinder; and
    the use of an intercooling system that utilizes an underground air supply to provide cool air to the fuel stream.

32. The method of claim 31, wherein the fuel stream temperature is further maintained by:
  the use of a fluid cooling system to dissipate heat from the engine; and
  dissipation of heat through a plurality of fins attached to the engine.

33. The method of claim 27, wherein the fuel stream temperature is maintained by:
  constructing the engine from a conductive alloy for quick heat dissipation;
  the use of a fluid cooling system to dissipate heat from the engine;
  dissipation of heat through a plurality of fins attached to the engine; and
  compressing the fuel stream to a ratio not more than 9:1 after the fuel stream is introduced to the engine intake port.

* * * * *